United States Patent
Lee et al.

(10) Patent No.: US 8,698,449 B2
(45) Date of Patent: Apr. 15, 2014

(54) CHARGER WITH DETECTION OF POWER INPUT TYPE

(75) Inventors: Li-Wei Lee, Hsinchu County (TW);
Nien-Hui Kung, Hsinchu (TW);
Kwan-Jen Chu, Hsinchu (TW);
Ying-Hsin Hsing, Taipei (TW)

(73) Assignee: Richtek Technology Corp., Hsinchu (TW)

( * ) Notice: Subject to any disclaimer, the term of this patent is extended or adjusted under 35 U.S.C. 154(b) by 255 days.

(21) Appl. No.: 12/856,837

(22) Filed: Aug. 16, 2010

(65) Prior Publication Data

US 2011/0043162 A1 Feb. 24, 2011

(30) Foreign Application Priority Data

Aug. 19, 2009 (TW) .............................. 98127850 A (51) Int. Cl.
*H02J 7/00* (2006.01)
(52) U.S. Cl.
USPC ......................................... 320/103; 320/138

(58) Field of Classification Search
USPC ................ 320/103, 139, 138; 307/43–46, 48, 307/64–66
See application file for complete search history.

(56) References Cited

U.S. PATENT DOCUMENTS

| | | | |
|---|---|---|---|
| 7,421,594 B2 * | 9/2008 | Nakajima et al. ............. | 713/300 |
| 7,489,974 B2 * | 2/2009 | Numano .......................... | 700/22 |
| 7,560,898 B1 * | 7/2009 | Kranzen et al. ................ | 320/107 |
| 7,863,865 B2 * | 1/2011 | Hussain et al. ................ | 320/140 |
| 8,402,175 B2 * | 3/2013 | Hwang .......................... | 710/16 |
| 8,412,861 B2 * | 4/2013 | Kim ................................ | 710/15 |
| 8,525,484 B2 * | 9/2013 | Lee et al. ........................ | 320/138 |
| 2009/0121684 A1 * | 5/2009 | Hussain et al. ................ | 320/139 |
| 2013/0002196 A1 * | 1/2013 | Lee et al. ....................... | 320/107 |

\* cited by examiner

*Primary Examiner* — Richard V Muralidar
(74) *Attorney, Agent, or Firm* — Muncy, Geissler, Olds & Lowe, P.C.

(57) ABSTRACT

A charger for a portable device includes a USB detector connected to a data pin to detect the effective resistance on the data pin before a USB transceiver is enabled, to identify USB or adapter plug in and control a charging current for a battery accordingly.

8 Claims, 10 Drawing Sheets

CHARGER WITH DETECTION OF POWER INPUT TYPE

FIELD OF THE INVENTION

The present invention is related generally to a charger and, more particularly, to a charger for portable devices.

BACKGROUND OF THE INVENTION

Figure 1:
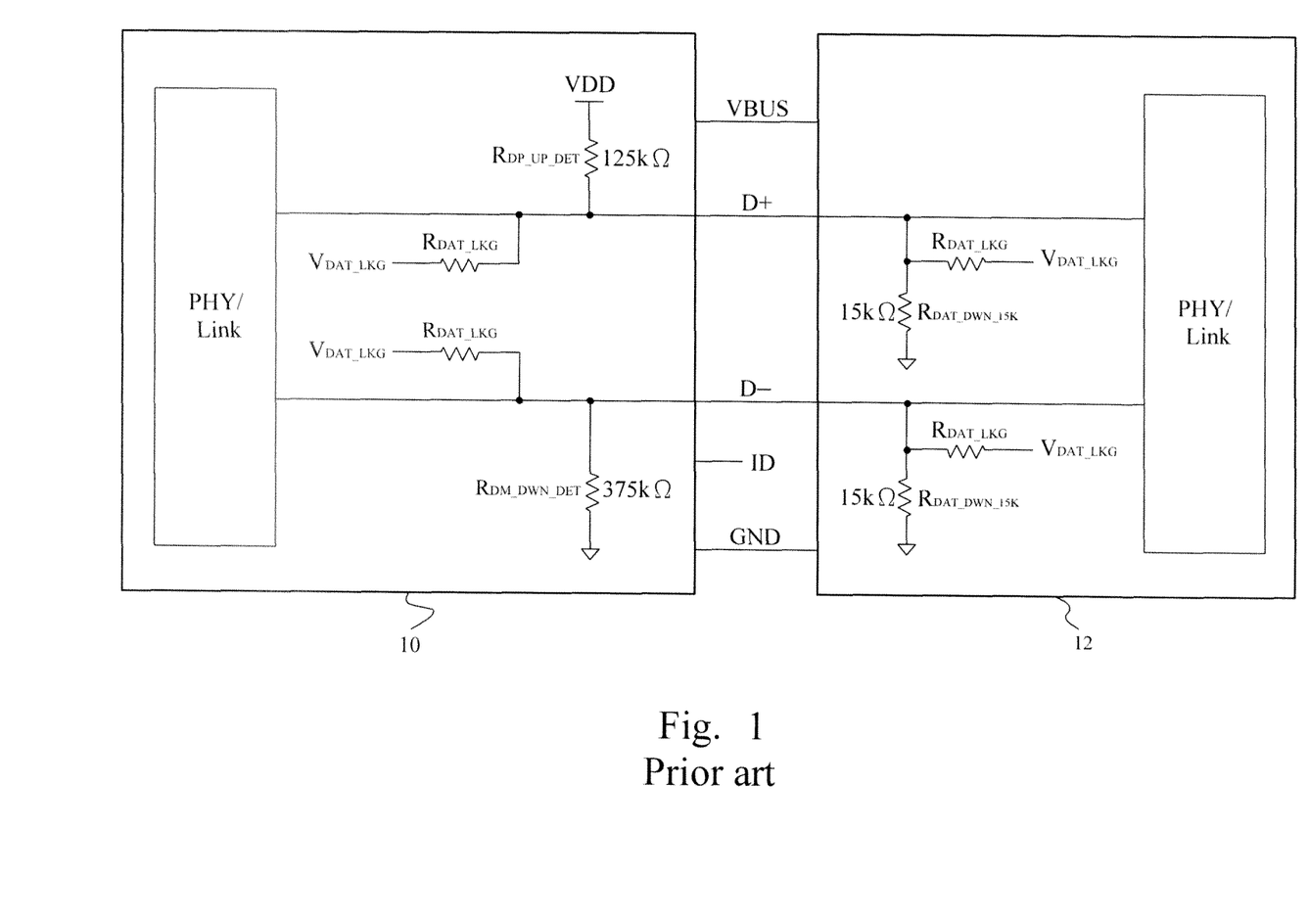
FIG. 1 is a schematic view of a conventional portable device connected to a USB.
Figure 2:
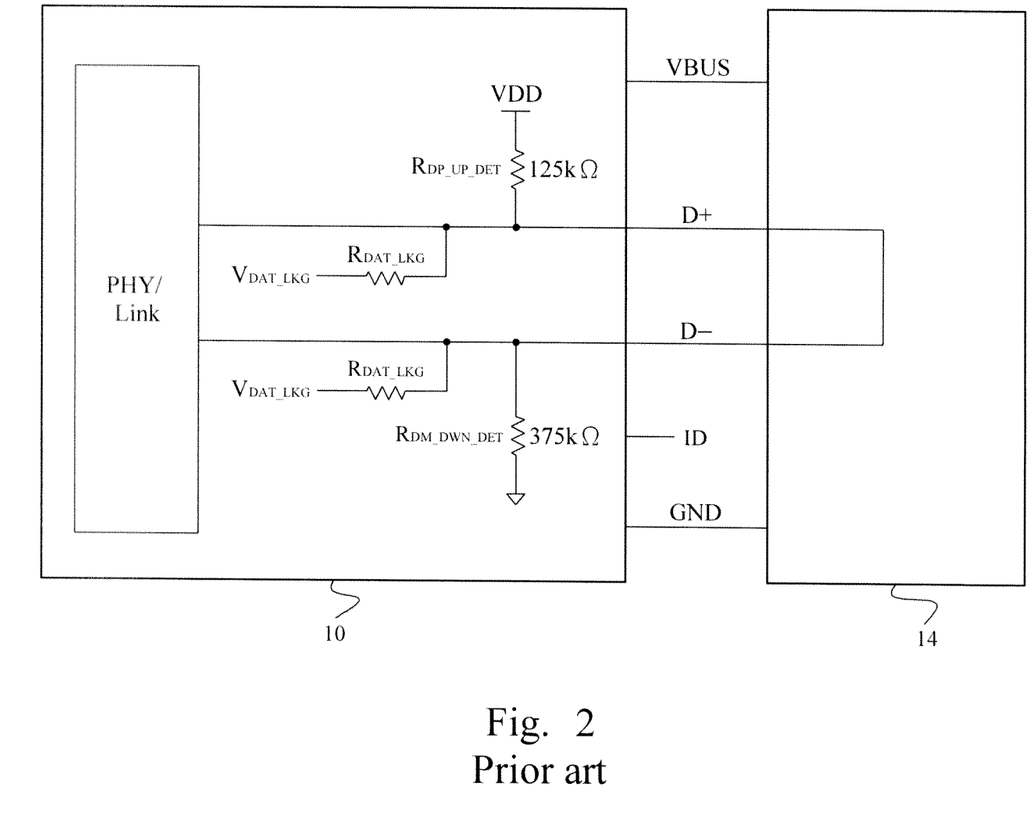
FIG. 2 is a schematic view of a conventional portable device connected to an adapter.

The interface of chargers for portable devices such as mobile phones, digital cameras, MP3 players and the like has been integrated into the USB interface, and thus the adapter of the chargers and the USB interface will use the same power source input pin of a connector due to the single power source input pin in the system. Therefore, the system has to detect the input type. As shown in FIG. 1, if the input to a portable device 10 is USB, the portable device 10 can transmit data to and from a host or hub 12 through the data pins D+ and D−. As shown in FIG. 2, if the input to the portable device 10 is adapter, the portable device 10 only can charge a battery. Furthermore, when an adapter 14 is plug-in, the charging current can be set up to 1 A; however, when a USB is plug-in, the charging current will be limited under 500 mA. Therefore, a good method to detect the power source type is important.

According to the USB specification, as shown in FIG. 1, when the portable device 10 is connected to a host or hub 12, each of the data pins D+ and D− at the mater will have a pull-down resistor $R_{DAT\_DWN\_15K}$ of 15 kΩ connected thereon. Referring to FIG. 2, when the portable device 10 is connected to an adapter 14, the data pins D+ and D− will be shorted to each other. Therefore, the USB detection commonly used is to connect a pull-up resistor $R_{DP\_UP\_DET}$ of 125 kΩ and a pull-down resistor $R_{DM\_DWN\_DET}$ of 375 kΩ to the data pins D+ and D− of the portable device 10 respectively, and then identifies the power source type by detecting the voltage levels of the data pins D+ and D−. As shown in FIG. 1, when USB is plug-in, the voltage of the data pin D+ is VDD×[15 k/(125 k+15 k)], and the supply voltage VDD applied to the pull-up resistor $R_{DP\_UP\_DET}$ is typically 4 V, so the voltage of the data pin D+ is about 0.4 V and is referred to a low level; meanwhile, the voltage of the data pin D− is approximately 0. As shown in FIG. 2, when an adapter 14 is plug-in, the data pins D+ and D− both are at the voltage of VDD×[125 k/(125 k+375 k)], i.e., about 3 V, which is referred to a high level. Thus, the voltage levels of the data pins D+ and D− can be used to identify the power source type of the portable device 10.

However, such detection requires the additional large resistors $R_{DP\_UP\_DET}$ and $R_{DM\_DWN\_DET}$, and the supply voltage VDD is provided by the portable device 10, which implies a burden on the battery of the portable device 10 and even results in false identification when the battery power is low.

SUMMARY OF THE INVENTION

An object of the present invention is to provide a charger and a portable device having the same.

Another object of the present invention is to provide a method for controlling a charging current of a charger for a portable device.

According to the present invention, a charger is connected to a data pin and is connected between a power input pin and a USB transceiver, and detects an effective resistance on the data pin to control a charging current during a detection period. The charger determines a setting of the charging current, which is smaller when USB plug in is detected than when adapter plug in is detected. When USB plug in is detected, the charger further provides power for the USB transceiver or enables the USB transceiver.

According to the present invention, a method for controlling a charging current detects an effective resistance on a data pin during a detection period to identify USB or adapter plug in, and then sets the charging current to a first value and provides power for a USB transceiver or enables the USB transceiver if USB plug in is detected, or sets the charging current to a second value greater than the first value if adapter plug in is detected.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which:

FIG. 6 is a timing diagram of the USB detector shown in FIG. 5 when a USB is plug in;

FIG. 7 is a timing diagram of the USB detector shown in FIG. 5 when an adapter is plug in;

DETAILED DESCRIPTION OF THE INVENTION

Figure 3:
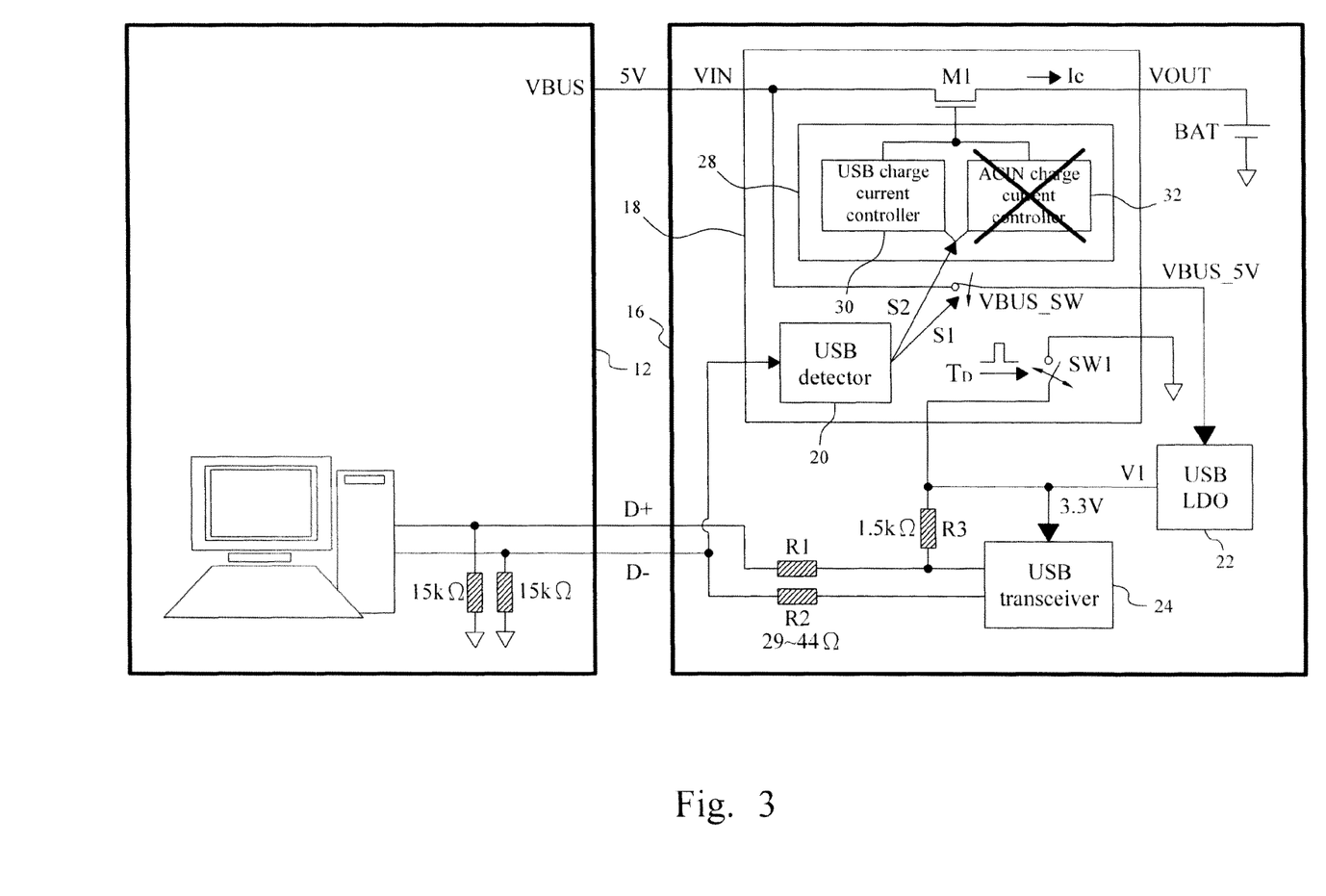
FIG. 3 is a schematic view of a portable device according to the present invention connected to a USB.
Figure 4:
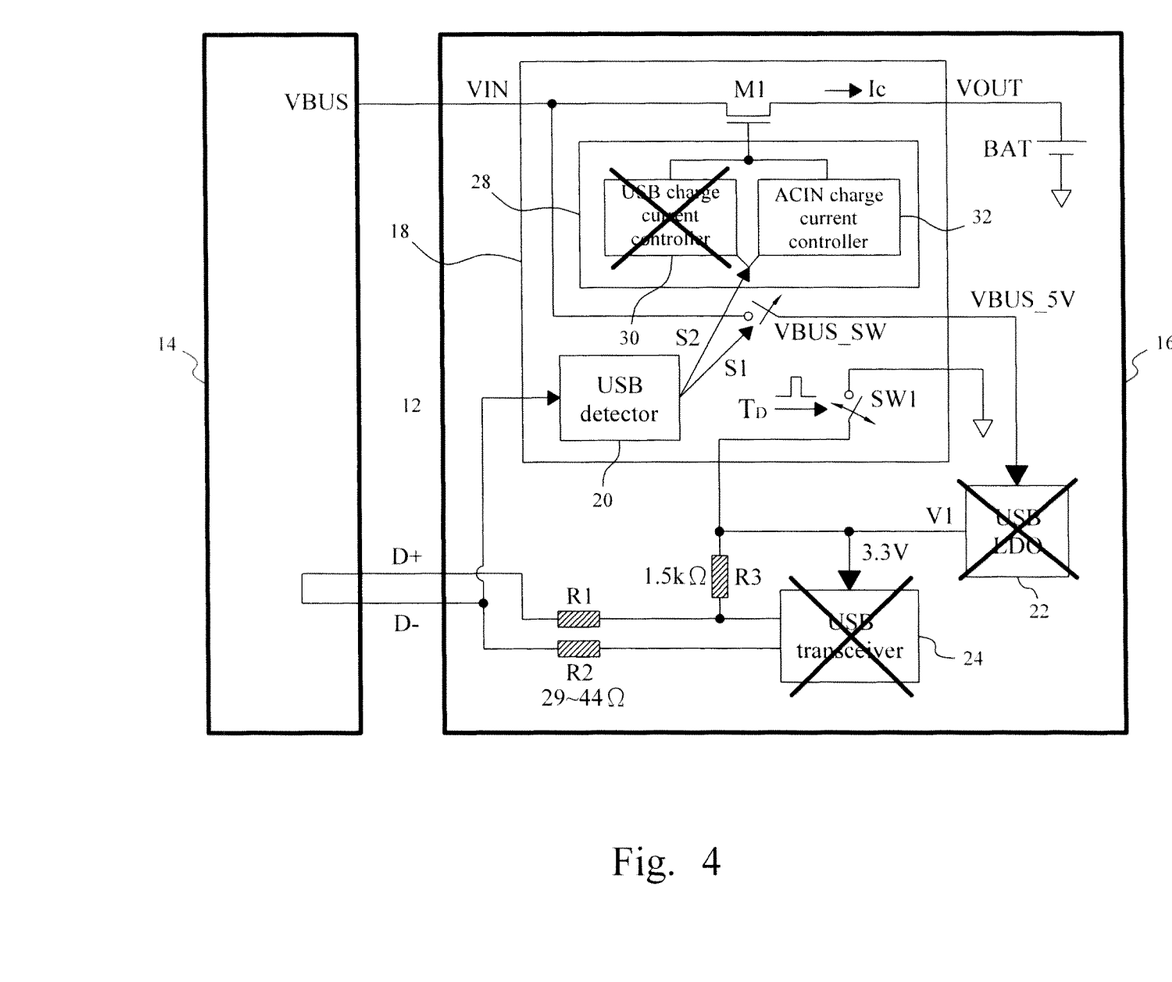
FIG. 4 is a schematic view of a portable device according to the present invention connected to an adapter.

FIGS. 3 and 4 show a portable device 16 according to the present invention when it is connected to a host or hub 12 and an adapter 14 respectively. Referring to FIG. 3, when a USB is plug in, a power pin VBUS is at a voltage of 5V, and each of the data pins D+ and D− has a pull-down resistor of 15 kΩ connected thereon. Referring to FIG. 4, when the adapter 14 is plug in, the adapter 14 converts the commercial power into a certain voltage VBUS supplied to the portable device 16, and the data pins D+ and D− are shorted to each other. Referring to FIGS. 3 and 4, the portable device 16 includes a charger 18 which has a power input terminal VIN connected to a power input pin VBUS of the USB, and a USB detector 20 connected to the data pin D− to identify the power source type by detecting whether or not a pull-down resistor of 15 kΩ is present on the data pin D−. The portable device 16 further includes a linear drop-out (LDO) regulator 22 connected to a power supply terminal VBUS_5V of the charger 18, and a USB transceiver 24 connected to a power output terminal V1 of the USB LDO 22 and, through the resistors R1 and R2 respectively, to the data pins D+ and D−. The charger 18 further includes a power output terminal VOUT connected to a lithium battery BAT to supply a charging current Ic to charge the lithium battery BAT, and a switch SW1 connected between the power output terminal V1 and ground and controlled by a detection signal $T_D$. When a power source is plug in, the USB detector 20 will detect the power source type before the USB transceiver 24 is enabled. If adapter plug in is detected, the USB transceiver 24 will not be enabled and the charger 18 sets the charging current Ic to 1 A. If USB plug in is detected, the charger 18 will provide power for the USB LDO 22 and limit the charging current Ic under 500 mA. The charger 18 further includes a USB power switch VBUS_SW connected between the power input terminal VIN and the power supply terminal VBUS_5V, a power transistor M1 connected between the power input terminal VIN and the power output terminal VOUT, and a charge current controller 28 connected to the gate of the transistor M1. According to the power source type, the USB detector 20 determines a first control signal S1 and a second control signal S2 for controlling the USB power switch VBUS_SW and the charge current controller 28 respectively. The charge current controller 28 has a USB charge current controller 30 and an ACIN charge current controller 32 both connected to the gate of the transistor M1 to control the charging current Ic. Referring to FIG. 3, when the USB detector 20 detects USB plug in, the first control signal S1 turns on the USB power switch VBUS_SW so that the charger 18 may provide power for the USB LDO 22 and the supply voltage VBUS_5V is 5V, which is then converted to a voltage V1 of 3.3 V for the USB transceiver 24, and the second control signal S2 enables the USB charge current controller 30 to control the charging current Ic. On the other hand, referring to FIG. 4, when the USB detector 20 detects adapter plug in, the first control signal S1 turns off the USB power switch VBUS_SW so that the USB transceiver 24 will not be enabled, and the second control signal S2 enables the ACIN charge current controller 32 to control the charging current Ic.

Figure 5:
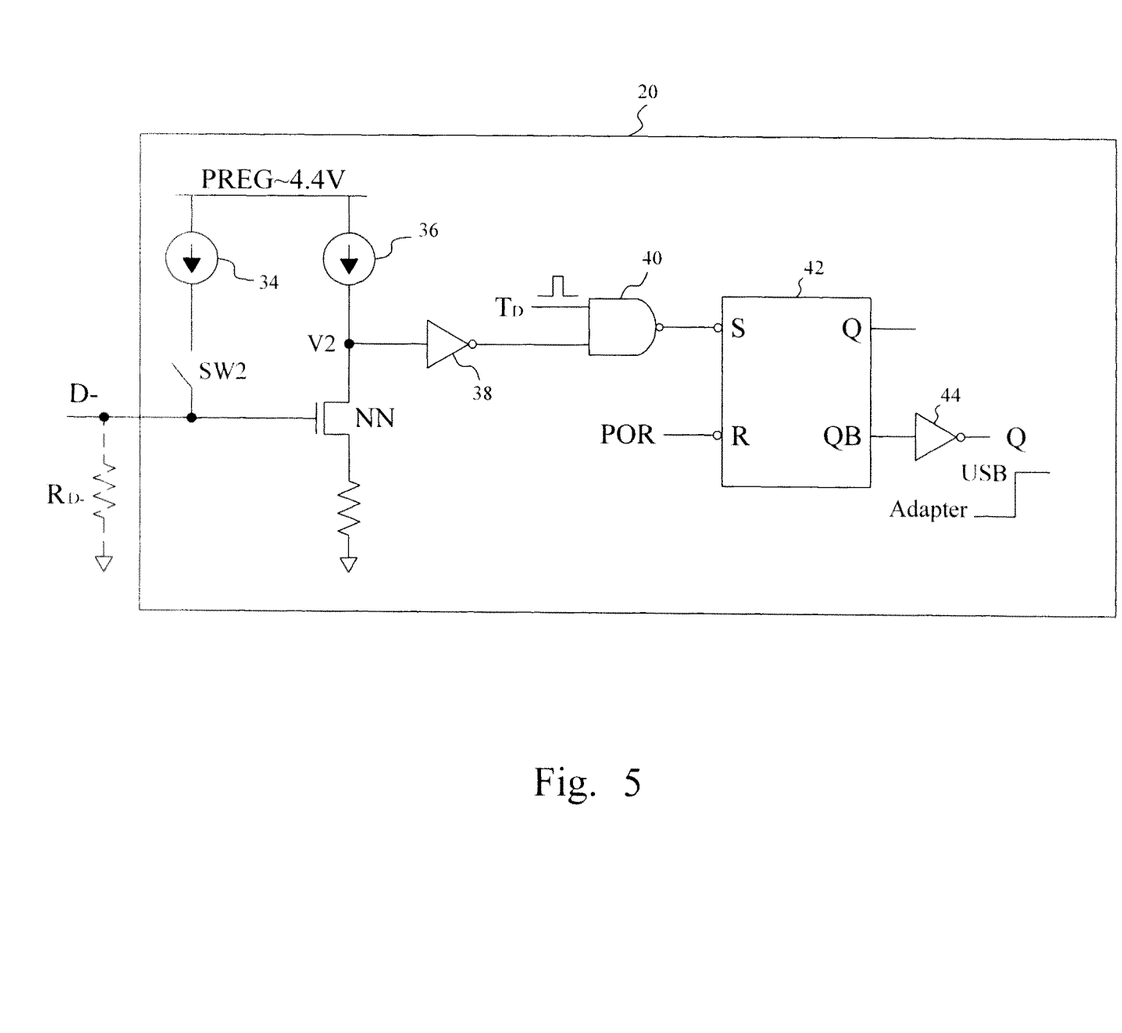
FIG. 5 is a circuit diagram of a USB detector according to the present invention.
Figure 6:
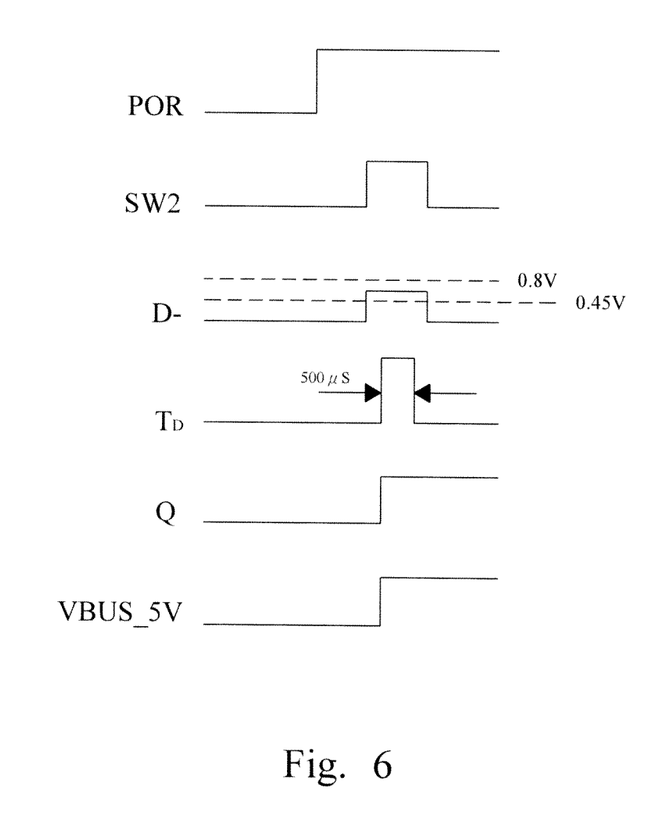
Figure 7:
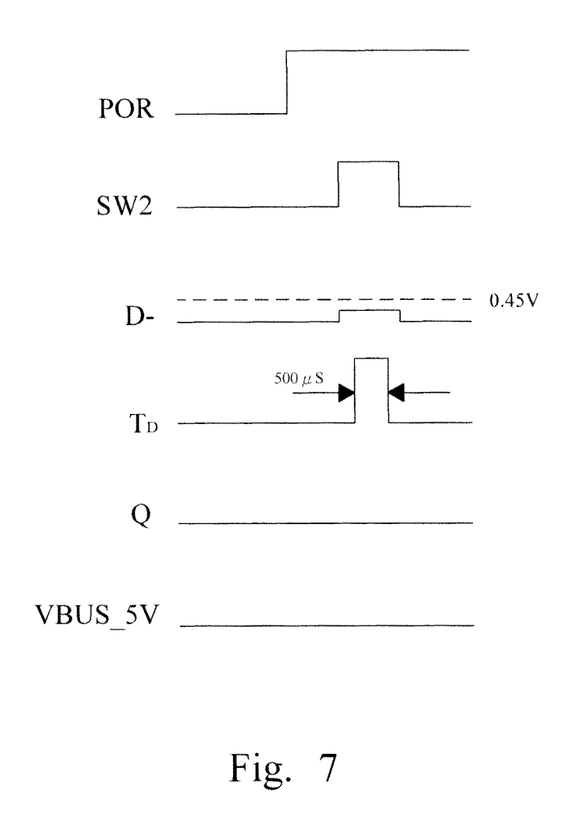

FIG. 5 is a circuit diagram of an embodiment for the USB detector 20 shown in FIGS. 3 and 4, in which a resistor $R_{D-}$ represents the effective resistor on the data pin D-. The resistor $R_{D-}$ has a resistance of about 15 kΩ for USB plug in and about 1.5 kΩ for adapter plug in. In the USB detector 20, a detecting transistor NN has its gate connected to the data pin D-, a first current source 34 and a precharge switch SW2 are connected in series between a precharge power source PREG and the gate of the detecting transistor NN, and a second current source 36 is connected between the precharge power source PREG and the drain V2 of the detecting transistor NN. When the switch SW2 is on, the first current source 34 provides a bias current flowing through the resistor $R_{D-}$ to generate a bias voltage applied to the gate of the detecting transistor NN. The resistance $R_{D-}$ determines the level of the bias voltage so as to turn on or turn off the detecting transistor NN. Referring to FIGS. 5 and 6, if the effective resistance $R_{D-}$ is 15 kΩ, the voltage at the gate of the detecting transistor NN will range between 0.45V and 0.8 V; consequently, the detecting transistor NN is turned on and the voltage V2 at the drain is low, which is then inverted by an inverter 38 to a high-level signal for a NAND gate 40. The other input of the NAND gate 40 is the detection signal $T_D$ which is a pulse having a period of about 500 µs, and only during this detection period, the output of the inverter 38 is allowed to reach the setting input S of an SR flip-flop 42 to trigger an output Q of the SR flip-flop 42. On the other hand, referring to FIGS. 5 and 7, if the effective resistance $R_{D-}$ is 1.5 kΩ, the gate voltage of the detecting transistor NN will be lower than 0.45 V; consequently, the detecting transistor NN is turned off and the drain voltage V2 thereof is high, with a result that the output Q of the SR flip-flop 42 remains low during the detection period $T_D$. The reset input R of the SR flip-flop 42 receives a power-on reset signal POR which is high only when the power source is ready and is otherwise at low. A falling edge of the power-on reset signal POR will reset the SR flip-flop 42.

Figure 8:
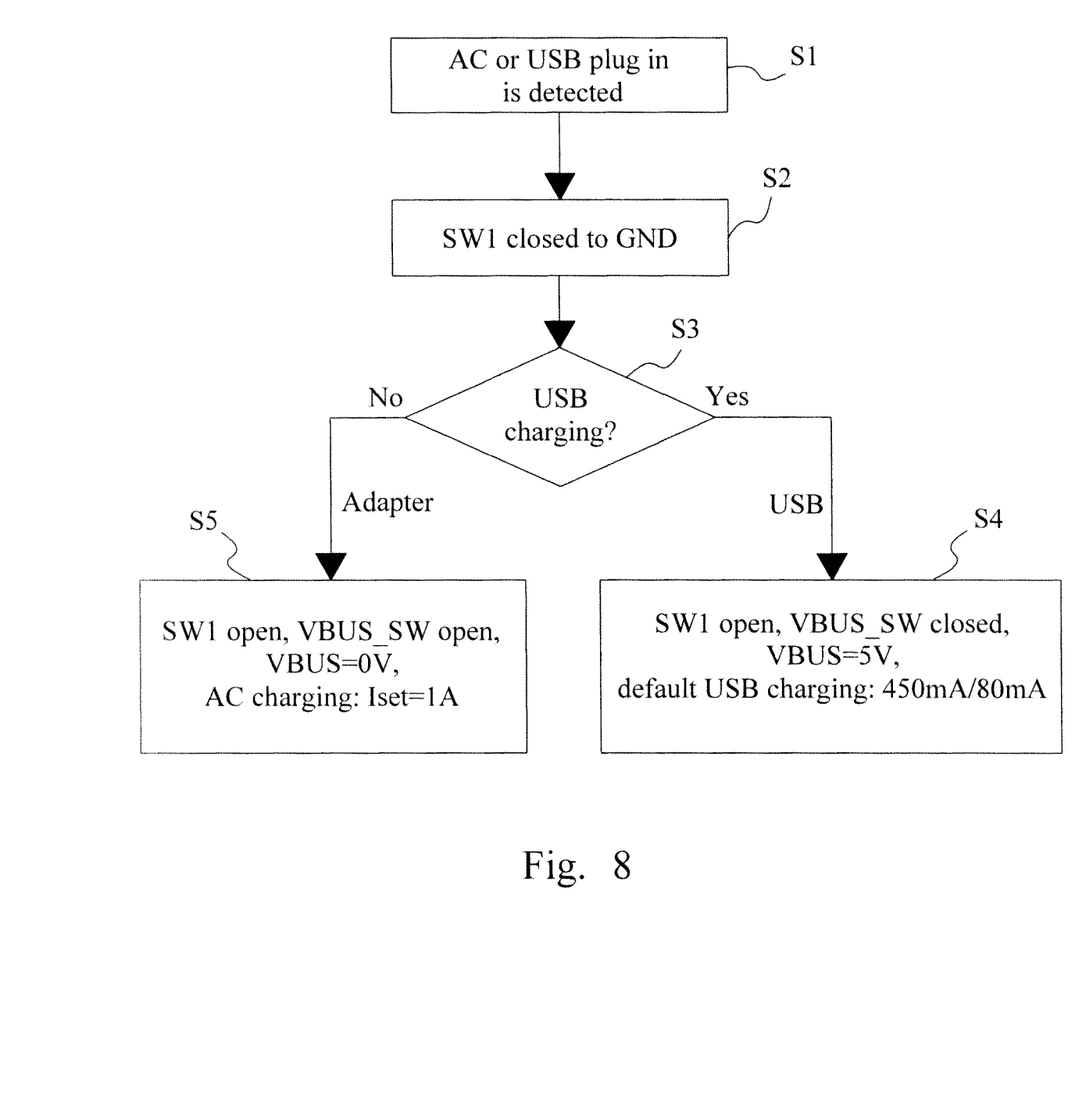
FIG. 8 is a flowchart of a control method according to the present invention.

FIG. 8 is a flowchart of a control method according to the present invention. Referring to FIGS. 3 and 8, in step S1 AC or USB plug in is detected, in step S2 the switch SW1 is closed to ground to ensure that the USB transceiver 24 will not be enabled, and in step S3 the effective resistance $R_{D-}$ on the data pin D- is detected to identify for USB charging. According to the current USB specification, the resistance of the resistors R1 and R2 range between 29Ω and 44Ω and the resistance of the resistor R3 is 1.5 kΩ, which are extremely small relative to 15 kΩ. Therefore, at USB plug in, the effective resistance $R_{D-\ on}$ the data pin D- can be regarded as 15 kΩ. If 15 kΩ is detected in step S3, then the switch SW1 is turned off and the USB power switch VBUS_SW is turned on in step 4 so that the USB detector 20 will enable the USB charge current controller 30 to control the charging current Ic. Because the USB power switch VBUS_SW is on, the USB LDO 22 is enabled by the voltage VBUS_5V of 5 V and, in turn, the USB transceiver 24 is enabled. Referring to FIGS. 4 and 8, if the adapter 14 is connected to the portable device 16, then the effective resistance $R_{D-\ on}$ the data pin D- is about 1.5 kΩ; in this case, as a result of the detection of the step S3, both the switches SW1 and VBUS_SW are turned off in step S5 so that the USB detector 20 will enable the ACIN charge current controller 32 to control the charging current Ic. Because the USB power switch VBUS_SW is off, the voltage VBUS_5V is zero and the USB transceiver 24 will not act.

Figure 9:
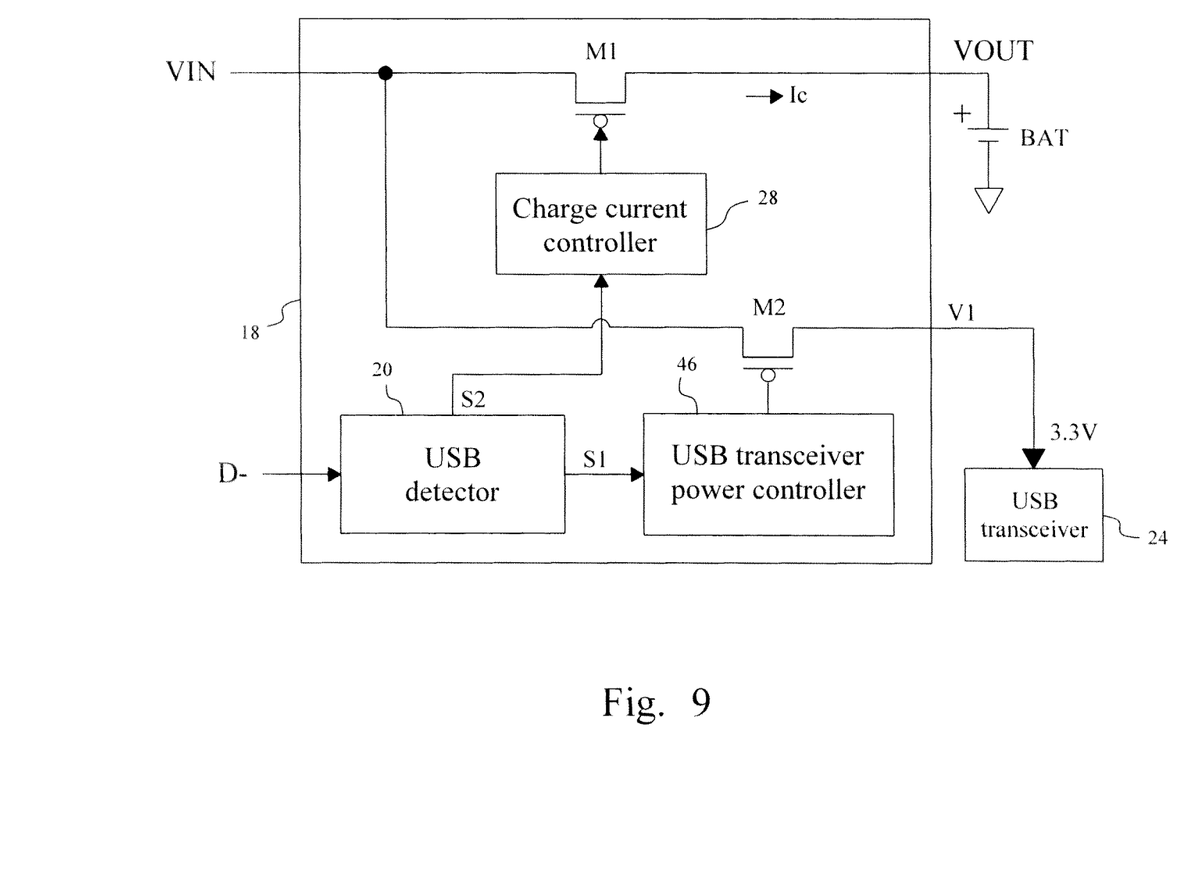
FIG. 9 is a circuit diagram of a second embodiment according to the present invention.

FIG. 9 is a circuit diagram of a second embodiment according to the present invention. For simplicity, a portion of the portable device 16 is not shown herein, and the second control signal S2 and the charge current controller 28 are identical to those of the first embodiment shown in FIGS. 3 and 4. In this embodiment, in addition to the first power transistor M1, the USB detector 20 and the charge current controller 28, the charger 18 further includes a second power transistor M2 connected between the power input terminal VIN and the power supply terminal V1, and a USB transceiver power controller 46 connected to the USB detector 20 and the gate of the second power transistor M2. When the USB detector 20 identifies USB plug in, the first control signal S1 activates the USB transceiver power controller 46 to control the second transistor M2 so that the input voltage VIN of 5 V is converted to the voltage V1 of 3.3 V for the USB transceiver 24. On the other hand, when adapter plug in is detected, the USB transceiver power controller 46 will not be turned on and the second power transistor M2 is not on, so the voltage V1 is zero and the USB transceiver 24 will not act.

Figure 10:
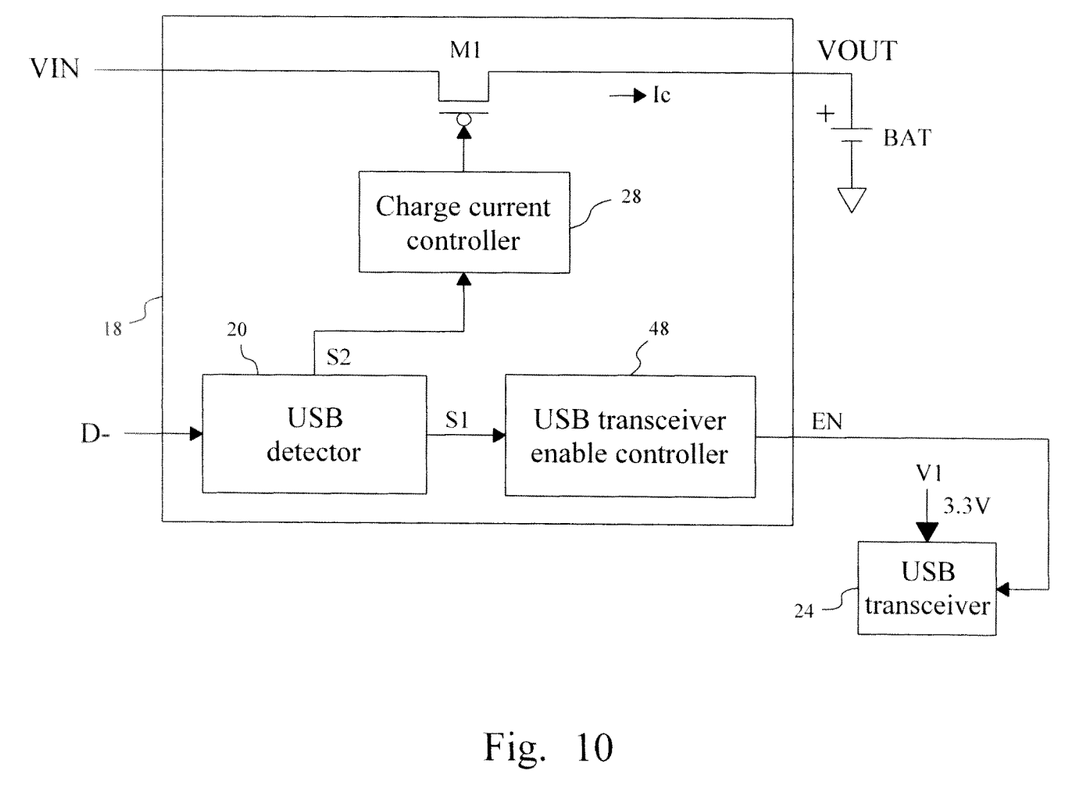
FIG. 10 is a circuit diagram of a third embodiment according to the present invention.

FIG. 10 is a circuit diagram of a third embodiment according to the present invention. For simplicity, a portion of the portable device 16 is not shown herein, and the second control signal S2 and the charge current controller 28 are identical to those of the first embodiment shown in FIGS. 3 and 4. In this embodiment, in addition to the USB detector 20 and the charge current controller 28, the charger 18 further includes a USB transceiver enable controller 48 to generate an enable signal EN for the USB transceiver 24 according to the first control signal S1. When USB plug in is detected, the USB transceiver 24 will be enabled by the enable signal EN; otherwise, the USB transceiver 24 is disabled.

Because the charger 18 has the USB detection integrated therein, it is unnecessary to dispose a large resistor in the portable device 16 and the burden on the battery BAT is removed.

In the aforesaid embodiments, it is the effective resistance on the data pin D− to be detected; however, in other embodiments, it may be the effective resistance on the data pin D+ to be detected instead.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A charger comprising:
a universal serial bus (USB) detector connected to a data pin, operative to detect an effective resistance on the data pin during a detection period to determine a first control signal and a second control signal;
a power input terminal connected to a power input pin;
a power transistor connected to the power input terminal and controlled to supply a charging current;
a charge current controller connected to the USB detector and a gate of the power transistor, the charge current controller being operative to receive the second control signal and control the charging current according to the second control signal;
a power supply terminal; and
a USB power switch connected between the power input terminal and the power supply terminal and switched by the first control signal.

2. The charger of claim 1, wherein the USB detector comprises:
a detecting transistor having a gate connected to the data pin;
a first current source and a precharge switch connected in series to the gate of the detecting transistor;
a second current source connected to a drain of the detecting transistor;
a logic circuit connected to the drain of the detecting transistor; and
an SR flip-flop connected to the logic circuit, for generating an output signal to determine the first and second control signals;
wherein the drain of the detecting transistor will have a voltage to trigger the output signal of the SR flip-flop when the detecting transistor is turned on during the detection period.

3. The charger of claim 1, wherein the charge current controller comprises:
a USB charge current controller connected to the gate of the power transistor, the USB charge current controller being enabled by the second control signal when USB plug in is detected by the USB detector; and
an ACIN charge current controller connected to the gate of the power transistor, the ACIN charge current controller being enabled by the second control signal when adapter plug in is detected by the USB detector.

4. The charger of claim 1, wherein the charge current controller determines a setting of the charging current according to the second control signal, which has a first value when USB plug in is detected by the USB detector and a second value greater than the first value when adapter plug in is detected by the USB detector.

5. A portable device comprising:
a data pin;
a universal serial bus (USB) transceiver connected to the data pin;
a power input pin; and
a charger connected to the data pin and connected between the power input pin and the USB transceiver, the charger being operative to detect an effective resistance on the data pin during a detection period to control a charging current;
wherein the charger determines a setting of the charging current, which has a first value when USB plug in is detected and a second value greater than the first value when adapter plug in is detected; and
wherein the charger comprises:
a USB detector connected to the data pin, operative to detect the effective resistance on the data pin during the detection period;
a power input terminal connected to the power input pin;
a power transistor connected to the power input terminal and controlled to supply the charging current;
a charge current controller connected to the USB detector and a gate of the power transistor, the charge current controller being operative to receive the second control signal and control the charging current according to the second control signal;
a power supply terminal for providing power for the USB transceiver; and
a USB power switch connected between the power input terminal and the power supply terminal and switched by the first control signal.

6. The portable device of claim 5, wherein the USB detector comprises:
a detecting transistor having a gate connected to the data pin;
a first current source and a precharge switch connected in series to the gate of the detecting transistor;
a second current source connected to a drain of the detecting transistor;
a logic circuit connected to the drain of the detecting transistor; and
an SR flip-flop connected to the logic circuit, for generating an output signal to determine the first and second control signals;
wherein the drain of the detecting transistor will have a voltage to trigger the output signal of the SR flip-flop when the detecting transistor is turned on during the detection period.

7. The portable device of claim 5, wherein the charge current controller comprises:
a USB charge current controller connected to the gate of the power transistor, the USB charge current controller being enabled by the second control signal when USB plug in is detected by the USB detector; and
an ACIN charge current controller connected to the gate of the power transistor, the ACIN charge current controller being enabled by the second control signal when adapter plug in is detected by the USB detector.

8. A method for controlling a charging current, comprising the steps of:
detecting an effective resistance on a data pin during a detection period to identify universal serial bus (USB) plug in or adapter plug in;
if USB plug in is detected, then setting the charging current to a first value, and providing power for a USB transceiver or enabling the USB transceiver;
if adapter plug in is detected, then setting the charging current to a second value greater than the first value; and
shutting down the USB transceiver during the detection period.

* * * * *